Nov. 3, 1964  J. M. ALLEN ETAL  3,155,185
TWO-WHEELED UTILITY VEHICLE HAVING A DRIVEN STEERING WHEEL
Filed Sept. 19, 1962  2 Sheets-Sheet 1
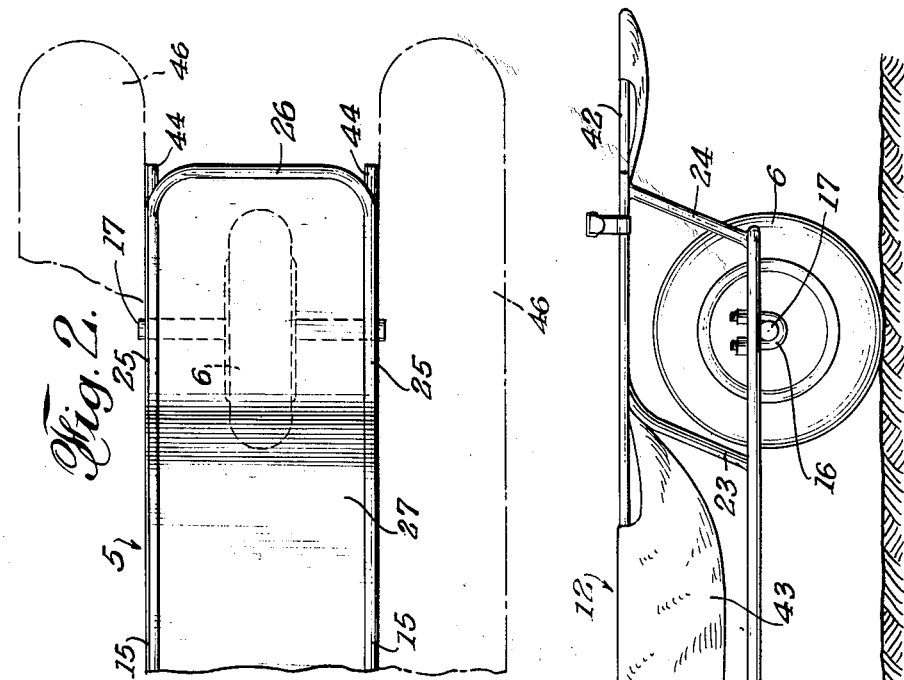
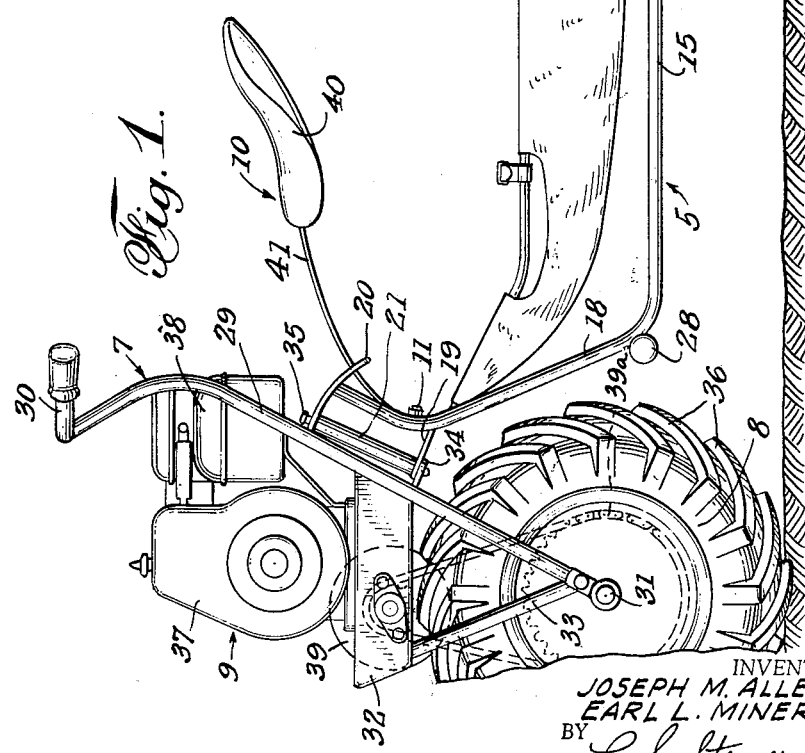
INVENTORS
JOSEPH M. ALLEN
EARL L. MINER
BY C. G. Stratton
ATTORNEY Nov. 3, 1964  J. M. ALLEN ETAL  3,155,185
TWO-WHEELED UTILITY VEHICLE HAVING A DRIVEN STEERING WHEEL
Filed Sept. 19, 1962  2 Sheets-Sheet 2
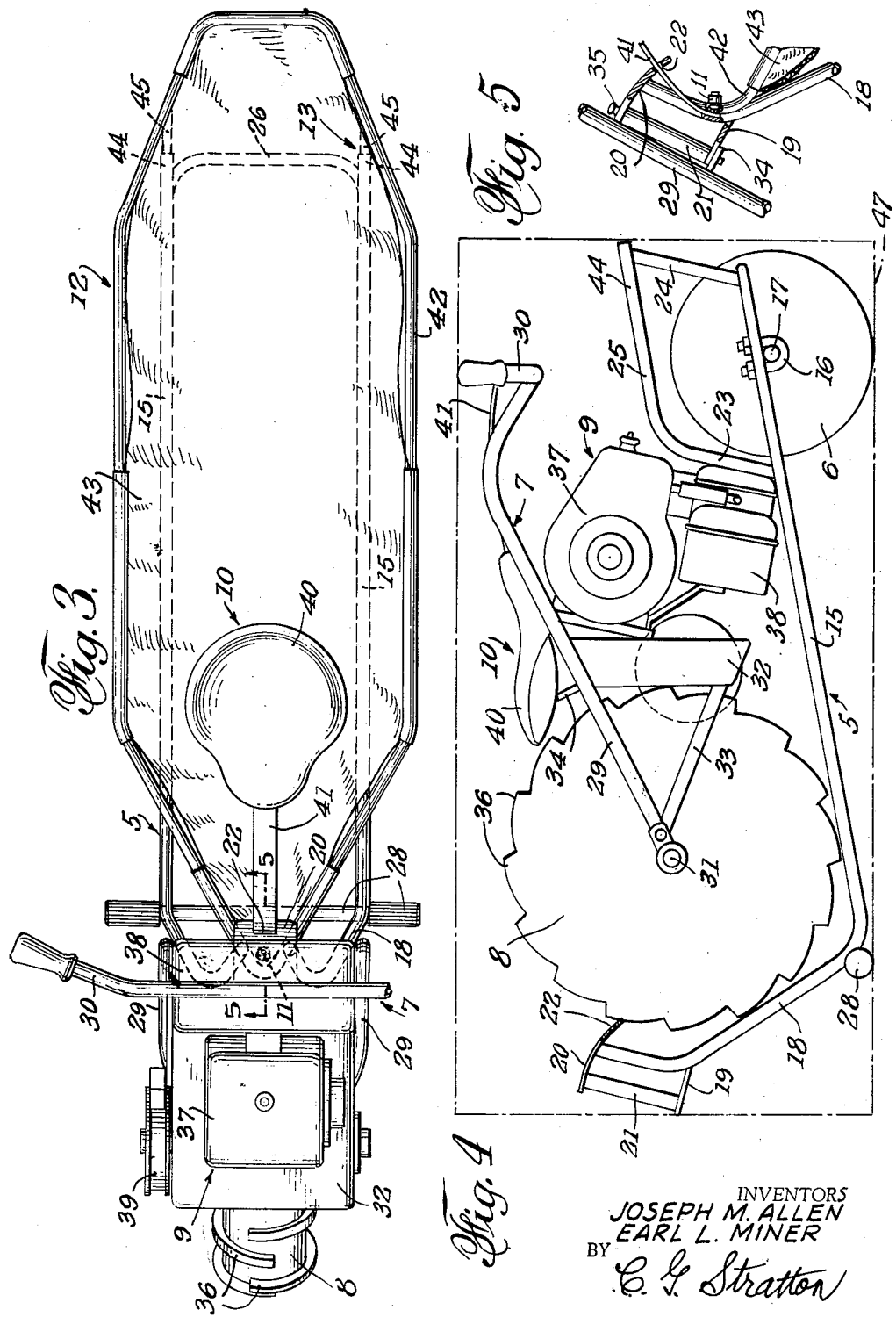
INVENTORS
JOSEPH M. ALLEN
EARL L. MINER
BY C. G. Stratton
ATTORNEY

United States Patent Office 3,155,185
Patented Nov. 3, 1964

3,155,185
TWO-WHEELED UTILITY VEHICLE HAVING A
DRIVEN STEERING WHEEL
Joseph M. Allen, P.O. Box 116, Caliente, Calif., and
Earl L. Miner, 1311 17th St., Oceano, Calif.
Filed Sept. 19, 1962, Ser. No. 224,786
3 Claims. (Cl. 180—31)

This invention relates to a two-wheeled vehicle having the purpose of not only providing transportation over difficult terrain, but also for carrying gear, a stretcher with an ill or injured person, and other items otherwise difficult to move over muddy and unimproved areas. Accordingly, an object of the present invention is to provide a two-wheeled vehicle having the facile utility above indicated.

Another object of the invention is to provide a vehicle of the character above indicated that, although two-wheeled, has good longitudinal stability, especially when loaded.

A further object of the invention is to provide a vehicle of the character referred to that is especially useful in undeveloped and rural areas and may be shipped to such areas in knock-down condition and in space-saving crates, the construction being such that the vehicle components may be assembled by persons of little mechanical skill using a simple tool or tools.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a partly broken side elevational view of a two-wheeled utility vehicle according to the present invention and shown with a litter or stretcher thereon.

FIG. 2 is a plan view of the rear portion of said vehicle with the litter removed and showing pontoons to convert the vehicle to one that is amphibious.

FIG. 3 is a plan view of the vehicle as shown in FIG. 1.

FIG. 4 is a side elevational view of the component parts of the vehicle in knock-down and nested position for shipping thereof crated.

FIG. 5 is a fragmentary vertical sectional view as taken on the plane of line 5—5 of FIG. 3.

The vehicle that is illustrated comprises, generally, a chassis 5 provided with a rear wheel 6, a front fork assembly 7 with a front wheel 8, a power unit 9 affixed to the assembly 7 and disposed above the wheel 8 thereof, and a seat 10 connected to the chassis 5, as by a bolt or the like 11. The vehicle thus provided may mount a litter 12 that has a rear connection 13 with the rearward end of the chassis, is generally coextensive with the chassis, and is fastened thereto by the mentioned bolt 11.

The chassis 5 comprises longitudinal side members 15 that extend rearwardly on either side of the wheel 6, U-bolts 16 on said members engaging the axle 17 of said wheel to clamp the same to said members 15 and thereby fixedly connecting the wheel to the chassis. The forward ends 18 of members 15 are upwardly directed and are connected by hinge plates 19 and 20 which, in turn, mount a hinge tube 21 forwardly of said ends 18. The plate 20 is provided with a transverse slot 22. The rear ends of the members 15 have upwardly and rearwardly directed struts 23 and 24 extending therefrom. Said struts are connected by longitudinal portions 25 that at their rear ends are joined by a transverse member 26. The space encompassed by the chassis members 15, 18, 23, 25 and 26 is spanned by a floor or platform 27 which has a low portion at about the level of the wheel axle 17, an elevated portion above the wheel 6, a sloping portion connecting said low and elevated portions, and a sloping portion between the ends 18 of the members 15. A foot bar 28 is provided at the bends where the ends 18 are upwardly directed, the same extending laterally of the side members 15, as shown in FIG. 3.

The above-described chassis, therefore, has an elevated article-supporting platform at the rear, and an article-supporting platform that is substantially lower and extends longitudinally between the chassis members 18 and 23.

The front fork assembly 7 is shown as comprising generally parallel side members 29 that are connected at their upper ends by handle bars 30 and at their lower ends by the axle 31 of the wheel 8. Said wheel resides between the members 29, a motor mount 32 being disposed above said wheel 8 and affixed to the fork sides 29. Brace members 33 support the forward end of said mount to provide a sturdy assembly. Hinge lugs 34, as needed, extend rearwardly from the fork assembly and cooperate with the hinge tube 21 to house a pintle 35 that constitutes a hinge on which said fork assembly is steerable, by means of its handle bars, relative to the chassis 5. In the present instance, the wheel 8 is provided with a tractor tread 36 for maximum traction with the ground.

The power unit 9 is mounted on the mount 32 forward of and partly between the fork sides 29 so as to be substantially directly above the axle 31 of wheel 8 and, by the weight thereof, bearing down to create desired wheel traction. In the usual way, said unit 9 comprises a motor 37, a gas tank 38, and such other components necessary to drive the wheel 8 and including a drive 39a, here shown as a chain drive. Said unit 9 is also shown as including a brake 39 which may be controlled from one of the handle bars 30.

It will be seen that the power unit 9 has an elevated position substantially higher than the platform of the chassis 5 and is protected, from beneath, by the mount 32. Thus, when the vehicle is driven over boggy terrain or even through water as much as one, two or more feet deep, the drive will not become fouled and will continue to operate properly. Said unit 9 is preferably mounted by the base of motor 37 on the mount and suitable brackets, braces and straps may be employed, as indicated, to mount the other components of the power unit on the motor.

The seat 10 comprises the conventional saddle 40 and an elongated spring leaf 41 to which said saddle is connected, and which extends through the mentioned slot 22 in the hinged plate 20. The free end of said leaf spring 41 is connected by the bolt 11 to the chassis 5. It will be noted that the saddle 40 is substantially elevated above the chassis platform, particularly the described lower portion thereof, thereby affording space for articles disposed on said platform and strapped or tied thereon to obviate accidental displacement.

The litter or stretcher 12 that is shown in FIGS. 1 and 3 comprises a frame 42 with a canvas 43 mounted in said frame to support a person with his head forward and legs resting on the elevated portion of platform 27. The connection 13 is shown as socket portions 44 extending rearwardly from the ends of chassis frame portions 25, and parallel pins 45 extending in a forward direction from the stretcher frame 42. It will be clear that the pins 45 may be slipped into the socket portions 44 by moving the stretcher in a forward direction. Then, by securing the forward end of said stretcher frame to the portions 18 of the chassis frame, preferably by the single bolt 11, the stretcher is non-displaceably secured to the vehicle so that the head and body are supported above the lower portion of the chassis platform, the thighs are disposed at or adjacent the sloping platform part between the chassis members 23, and the calves of the legs rest upon the elevated portion of the chassis platform. The person thus disposed may be strapped into the stretcher by suitable straps and easily and with safety placed in the vehicle or removed therefrom.

The vehicle may be rendered amphibious by providing pontoons 46 at the sides and at a level to float the vehicle with only the wheels 6 and 8 in the water. The fork assembly may be used to steer the vehicle thus floated and the cleats of the tractor tread 36 constitute a means for propelling the vehicle while so floating.

As shown in FIG. 4, the above-described components, exclusive of the stretcher which may be optionally provided, may be knocked down for rearrangement so the same may be enclosed in a crate suggested by the dot-dash lines 47. As above indicated, said components may be assembled with easy facility with little mechanical skill and knowledge.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A utility vehicle comprising:
   (a) a chassis having a support wheel at its rear end and provided with a platform having a rear portion elevated above said wheel and a lower portion forward of the wheel at the approximate level of the axle of said wheel, an upwardly directed extension being provided on the chassis forward of the low level portion of the platform,
   (b) a steerable power-driven unit for propelling the vehicle and hingedly connected to and forward of the upwardly directed extension of the chassis,
   (c) a stretcher supported, in part, by the mentioned elevated rear portion of the chassis, said stretcher including a frame that is wider than the chassis with a portion extending rearwardly beyond the rear end of the chassis,
   (d) means separably connecting said elevated rear portion of the chassis and the rearward end of the stretcher frame,
   (e) a separable connection between the forward end of the stretcher frame and the chassis adjacent to the hinge connection of the latter with the steerable unit, and
   (f) the portion of the stretcher between the elevated rear portion of the chassis platform and the last-mentioned separable connection being spaced above the lower forward portion of the chassis and platform.

2. A utility vehicle according to claim 1 in which the first-mentioned separable connection comprises longitudinally fitted socket and pin portions on the chassis and stretcher frame, and a second-mentioned separable connection comprises a single fastener securing together the stretcher frame and chassis to retain the first-mentioned connection engaged.

3. A utility vehicle according to claim 2 in which is provided a seat for the operator of the vehicle, said single fastener securing together the seat, chassis and stretcher frame.

References Cited in the file of this patent

UNITED STATES PATENTS

| | | |
|---|---|---|
| 586,851 | Knepper | July 20, 1897 |
| 1,052,829 | Karminski et al. | Feb. 11, 1913 |
| 1,290,276 | Merkel | Jan. 7, 1919 |
| 1,608,512 | Kent | Nov. 30, 1926 |
| 2,244,709 | Kinzel | June 10, 1941 |
| 2,503,106 | Fritz | Apr. 4, 1950 |
| 2,522,867 | Goldammer et al. | Sept. 19, 1950 |
| 2,757,631 | Truter | Aug. 7, 1956 |
| 2,821,949 | Uyehara | Feb. 4, 1958 |
| 2,910,130 | Schlaphoff | Oct. 27, 1959 |
| 2,979,338 | Dwyer | Apr. 11, 1961 |
| 3,016,967 | Rehfeld | Jan. 16, 1962 |

FOREIGN PATENTS

| | | |
|---|---|---|
| 1,175,607 | France | Nov. 17, 1958 |